З,473,864
Patented Oct. 21, 1969

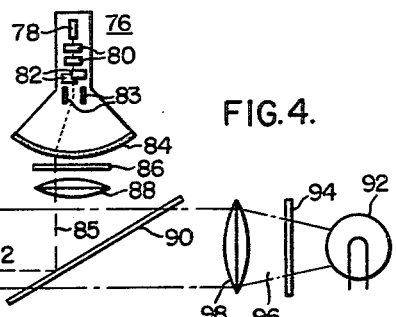
FIG.4.
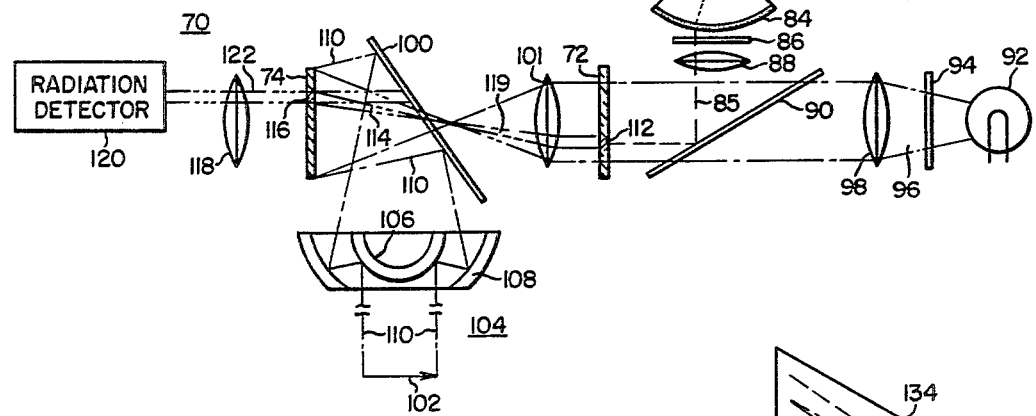
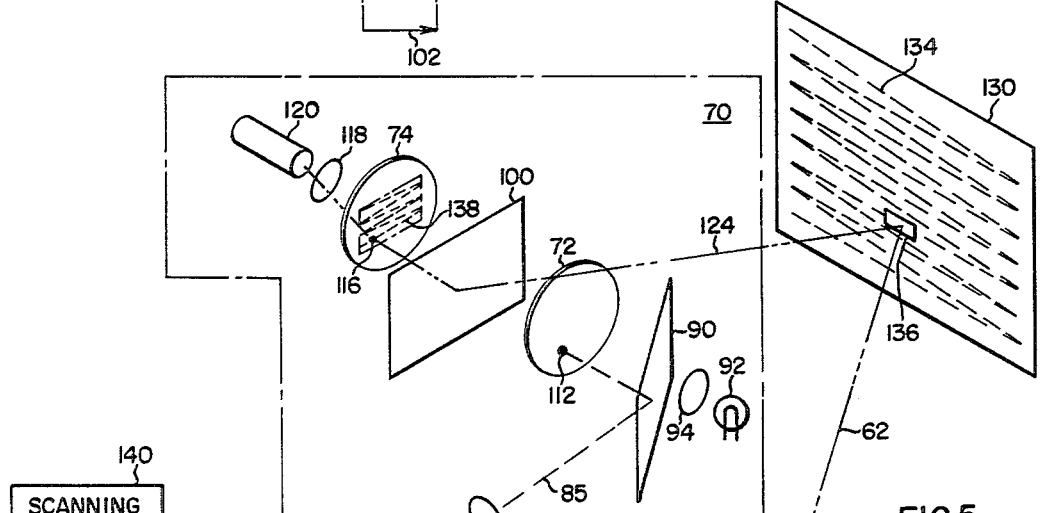
FIG.5.
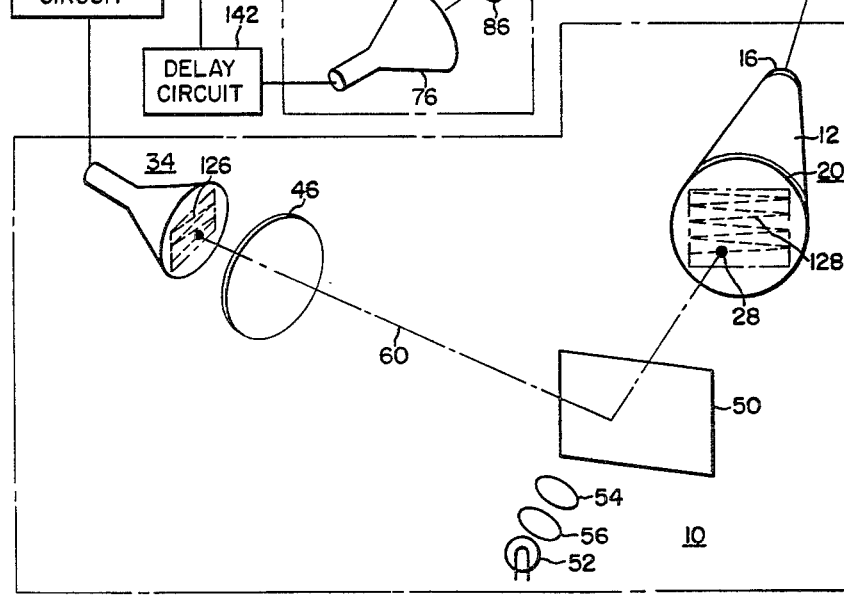

3,473,864
RADIATION REGULATING SYSTEM
Max Garbuny, Pittsburgh, Pa., assignor to Westinghouse
Electric Corporation, Pittsburgh, Pa., a corporation of
Pennsylvania
Filed May 19, 1966, Ser. No. 551,457
Int. Cl. G02f 1/36
U.S. Cl. 350—160
14 Claims

ABSTRACT OF THE DISCLOSURE

This invention relates to a radiation regulation system comprising a first filtering element capable of transmitting radiation of a wavelength above a first value and of absorbing radiations of a wavelength below the first value thereby becoming opaque to radiation. A second filtering element is provided for preventing radiation of a wavelength below the first value from being directed onto selected portions of the first filtering element to thereby render these selected portions transmissive.

---

This invention relates to apparatus for controlling radiation and more particularly to system for selectively controlling the viewing or the directing of radiation.

Recently, the invention of the optical maser or laser has made possible the generation of coherent electromagnetic waves at high frequencies, i.e. ultraviolet, visible, and infrared radiation. Coherent radiation in these frequency ranges is capable of carrying extremely large quantities of information. Furthermore, optical frequency radiation can be transmitted in very narrow beams of radiation without the need for complex antennae and with the consequent economy of radiated power. Compared to microwave scanning systems, laser beams can be generated by sources of small geometric extent and weight; further, much higher resolving power is possible with laser beams. In order to realize the maximum potential of such optical masers, it is necessary that apparatus be provided for controlling the coherent radiation waves of such very high frequencies.

Further, it would be desired to provide suitable means for scanning a beam of coherent radiation in a set pattern or raster to thereby provide a display of information or in another application, to illuminate a field of view with coherent radiation which is to be then sensed by suitable detection means. Typically, the scanning of laser beams has been accomplished by a mirror or a plurality of mirrors each having a plurality of reflective surfaces and which are driven by suitable motor means at the desired scanning rate. However, such mechanical systems, aside from their complexity, are limited as to the rate of scanning the optical beam and therefore the rate at which information may be received from the field of view upon which the radiation is directed. Mechanical scanners incorporating the use of rotating mirrors may ultimately scan and retrieve information at the rate of only $10^4$ to $10^5$ elements per second.

Further, there has been suggested in the copending application (W.E. Case No. 37,110) to Garbuny and Jones, entitled "Laser Scanning System," filed Oct. 17, 1966, Ser. No. 587,042 and assigned to the assignee of this invention, means for electronically scanning a beam of coherent radiation. Illustratively, this system includes an optical laser with mirrors upon both ends thereof; more specifically, the reflectivity of one of the mirrors may be modulated at instantaneous element loiations to thereby provide a beam of coherent light between specified points of the mirrors providing a selected direction of the emerging laser beam. Further, the reflection modulation of the mirror may be achieved by making the mirror of a suitable semiconductor material and scanning it with an electron beam or light spot to increase the reflectivity of the mirror by free carrier generation. Although such a system represents a great advance over the prior art, it is desired to provide a system of greater efficiency. More particularly, in order to modulate the reflectivity of the semiconductive member, it is necessary to generate large densities of carriers within the semiconductor material thus requiring intense beams of electrons or light.

The radiation control system of this invention is not limited to the scanning of optical lasers. In particular, typical image forming camera tubes such as the television vidicon or orthicon tube have not proved to be a suitable means for detecting and imaging infrared radiation. Instead, mechanical scanners as described above utilizing rotating mirrors have been adapted to dissect an infrared radiation image or, in other systems, for scanning beams of visible or infrared radiation onto the desired field of yield from which reflected radiation is sensed by a suitable detector. As set out above, the use of mechanical scanners is limited as to the rate of information which may be sensed and detected. Furthermore, their use requires a complex and unwieldy apparatus.

It is accordingly an object of the present invention to provide new and novel systems for regulating radiation.

It is a more specific object of this invention to provide a system for electronically scanning radiation detection and projection systems at rates in excess of those obtainable by the prior art.

It is a more specific object of this invention to provide a system for scanning a beam of coherent radiation as provided by an optical laser without the use of mechanical scanners as employed by the prior art.

It is a further object of this invention to provide a system for electronically scanning a beam of coherent radiation as provided by a laser at rates in the order of $10^7$ elements per second and with greater efficiency than obtained with the means of the prior art.

It is a still further object of this invention to provide a system for electronically detecting infrared radiation without the use of rotating mirrors and at rates in the order of $10^7$ elements information per second.

These and other objects are accomplished in accordance with the teachings of the present invention by providing a new and improved system for controlling radiation including a first filtering element capable of transmitting radiation of a wavelength above a first value and of absorbing radiation of a wavelength below the first value thereby becoming opaque to radiation. A second filtering element is provided for preventing radiation of a wavelength below the first value from being directed onto selected portions of the first filtering element to thereby render these selected portions transmissive. More specifically, the second filtering element has the property of transmitting radiation of a wavelength above a second value and absorbing radiation of a wavelength below the second value which is less than the first value. Further, a first source is provided for directing a flood beam of radiation of a bandwidth whose lower limit lies between the first and second values through the second filtering element onto the first filtering element to render substantial portions of the first filtering element opaque to radiation. A second source is provided for directing a defined beam of radiation of a wavelength less than the second value onto a selected portion of the second filtering to render this portion opaque to radiation. The second filtering element is disposed with respect to the first source of radiation so that the opaque portion of the second filtering element will prevent a portion of the radiation of the first source from being directed onto the first filtering element thereby establishing a portion of the first element transmissive to radiation. Thus, by scanning the defined beam of light from the second source in a desired pattern or raster, a transmissive portion may be so positioned or scanned across the first filtering element to thereby control the direction or scanning of a third source of radiation which may be directed through the transmissive portion of the first element.

In one particular embodiment of this invention, a laser may be provided with first and second reflective surfaces on either end of this device. Further, the first reflective surface is disposed between the first and the second filtering elements as described above. More specifically, as an elemental portion of the first element is made transmissive, a beam of radiation is directed through the transmissive portion of the second element to be reflected by the first surface and to thereby strike a laser mode between the first and second reflective surfaces.

In a further embodiment of this invention, infrared radiation may be detected by directing such radiation through the transmissive portion of the first filtering element onto a suitable detector. More specifically, the defined beam of light is scanned across the second element thereby rendering a corresponding portion of the first element transmissive to infrared radiation. A portion of the infrared radiation is directed through the transmissive portion of the first element to be received by the detection means. Thus in effect, an incremental portion of the infrared radiation is successively viewed by the means for detecting to derive an output signal corresponding to the scene of infrared radiation.

These and other objects and advantages of the present invention will become more apparent when considered in view of the following detailed description and drawings, in which:

FIG. 4 is a diagrammatic drawing illustrating a second embodiment of this invention; and FIG. 5 is a diagrammatic drawing of an optical scanning system including the radiation scanning system of FIG. 1 and the radiation detection system of FIG. 4.

Figure 1:
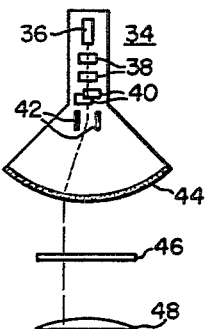
FIGURE 1 is a schematic drawing illustrating a first embodiment of the system of this invention.
Figure 1:
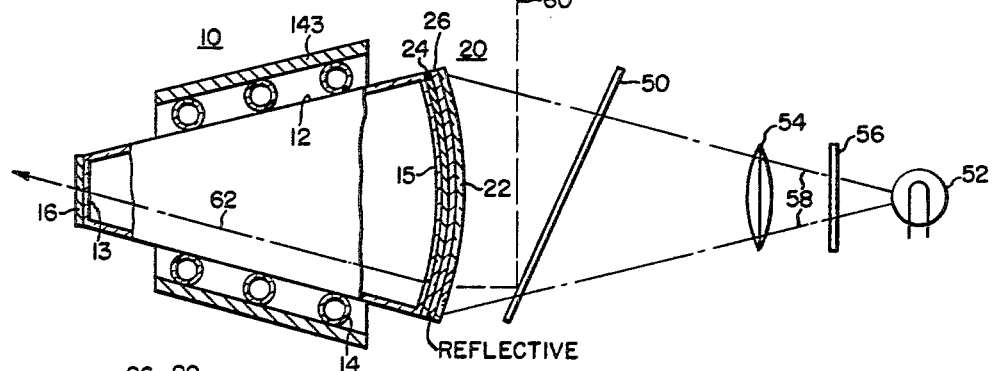

Referring now to the drawings and in particular to FIG. 1, there is shown an illustrative embodiment of the optical regulating system 10 in accordance with the teachings of this invention including a source of coherent radiations such as a laser 12 having end surfaces 13 and 15. The laser 12 is preferably of such a configuration that end surface 15 is of greater area than end surface 13. A mirror 16 of a suitable reflecting material such as a coating of silver may be disposed upon the end surface 13 of the laser 12. It is noted that in certain gas type lasers it may be desirable to dispose the mirror 16 within the enevelope of the laser. Further, a reflector assembly 20 is disposed upon the enlarged end of the laser 12 to establish points of reflectivity so that a laser mode may be struck between the assembly 20 and a point upon the mirror 16 to thereby generate a beam 62 of coherent radiation. The mirror 16 is preferably highly reflecting, typically 80–99%, with almost all of the remaining portion of the beam 62 of coherent radiation to be transmitted therethrough. A suitable source of pumping energy such as the radiation source 14 is disposed as in the form of a helical coil about the laser 12. A diffuse reflector 143 of a suitable material such as magnesia may be disposed about the source 14 to pump energy incident on the laser. Electrical excitation may be preferred in other embodiments depending upon the type of laser employed.

Further, the reflector assembly 20 includes a second light absorbing layer or filter element 22 which is disposed adjacent one end of the laser 12. A first light absorbing layer or filter element 24, and a layer 26 of a suitable selectively reflective material is disposed between the first and second light absorbing layers 24 and 22. It is necessary in order to strike a laser mode between incremental parts of the reflective surfaces 16 and 26 that the incremental parts be parallel to each other. In one preferred embodiment of this invention, the laser 12 has a conical optical cavity bounded by end surfaces 13 and 15 which are of a spherical configuration and are concentric with respect to each other.

A suitable source for generating and scanning a defined beam of radiation such as a cathode ray tube 34 is provided for directing a beam 60 of radiation onto a beam splitter 50 which in turn reflects the beam 60 onto the reflector assembly 20. In particular, the cathode ray tube 34 includes a cathode element 36 for generating electrons, a pair of focusing electrodes 38 for defining the electrons into a beam which is then scanned as by the vertical and horizontal deflection plates 40 and 42 onto a phosphor layer 44. In response to the incident electron beam, the phosphor layer 44 emits the beam 60 of radiation which is focused as by a lens assembly 48 onto the beam splitter 50. The beam 60 of radiation is directed through a filter element 46 to ensure that the wavelength of the beam 60 of radiation is of a defined value.

Further, a suitable source 52 of radiation is provided in order to flood substantially the entire surface area of reflector assembly 20 with a flood beam 58 of radiation of a wavelength of a defined value. The radiation emitted from the source 52 is filtered as by element 56 to ensure that the radiation is of a specified wavelength and is focused as by an optical assembly 54. It is noted that the beam splitter 50 has the property of reflecting the defined beam of radiation 60 and of being transmissive to the flood beam 58 of radiation.

Figure 2:
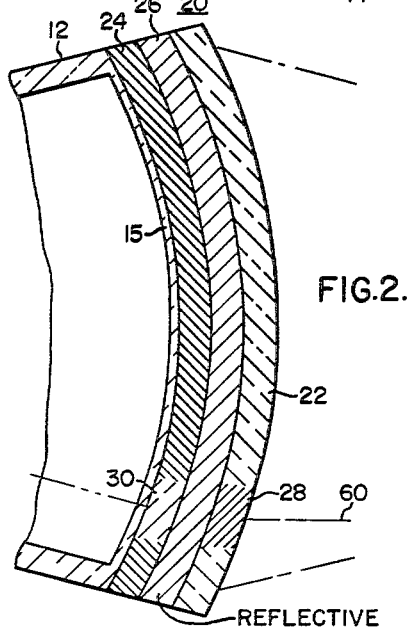
FIG. 2 is a detailed drawing showing the assembly as incorporated in FIG. 1 for successively establishing various portions of an opaque member transmissive to light so that a laser mode may be struck between two reflective surfaces.
Figure 3:
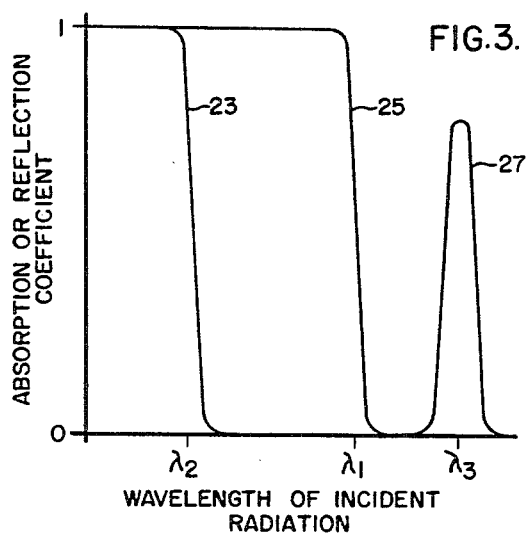
FIG. 3 shows in graphical form the degree of absorption and reflection of the various elements of the assembly shown in FIGS. 1 and 2.

Referring now to FIGS. 2 and 3, the establishment of a scan beam of coherent light in accordance with this invention will now be explained. In particular, the second radiation absorbing element 22 is made of a material having a spectral absorption edge 23 of a defined value $\lambda_2$ as shown in FIG. 3. The absorption edge may be defined as that wavelength at which the radiation absorption is sharply reduced as the wavelength is changed from shorter to longer values. Substantially all of the unreflected energy containing wavelengths smaller than the absorption edge 23 is absorbed by the second radiation absorbing element 22 whereas longer wavelengths are transmitted by the first radiation absorbing element. The first light absorbing element 24 is made of a material having a spectral absorption edge 25 of a first value $\lambda_1$. Further, as radiations of wavelengths below the first value $\lambda_1$ and the second value $\lambda_2$ are respectively directed onto elements 24 and 22, free carriers are generated within the elements. As a result, the optical properties of the elements 24 and 22 approach those of a metal in that the elements 24 and 22 become opaque to radiation (whether above or below the values $\lambda_1$ and $\lambda_2$) in the interested spectrum between approximately 3000 A (near ultraviolet) and 2 MM (for infrared). As shown in FIG. 3, the first value $\lambda_1$ is of a greater wavelength than the value $\lambda_2$. Further, the source 52 emits a radiation which is filtered by the element 56 so that the flood beam 58 of radiation is of a wavelength band whose lower limit lies between $\lambda_1$ and $\lambda_2$. It is noted that the requirement for the spectral band of the source 52 is critical in that the lower wavelength lies above the second value $\lambda_2$ and below the first value $\lambda_1$, whereas the upper limit may extend above the first value $\lambda_1$. The flood beam 58 which is directed over the reflector assembly 20 will be transmitted by the second absorbing layer 22 but will be absorbed by the first light absorbing layer 24. As shown in FIG. 2, the first absorbing layer 24 has been shown to be darker to thereby indicate that the layer 24 is now opaque to radiation and in particular to the coherent radiation as is generated within the laser 12. Thus, with the first absorbing element 24 opaque to radiation, the reflective layer 26 is not seen by the laser 12 and a laser mode is not struck between the mirror 16 and the reflective layer 26.

In order to establish an elemental portion 30 of the first light absorbing element 24 transmissive, the beam 60 of radiation is directed onto the second light absorbing element 22. More specifically, the beam 60 is filtered as by the element 46 to ensure that the radiation is of a wavelength less than the value indicated in FIG. 3 as $\lambda_2$. Thus, as the beam 60 is directed onto the second light absorbing element 22, an elemental portion 28 is rendered opaque and beam 60 will be absorbed therein. Further as a result, the flooding beam 58 of radiation which is directed over substantially the entire area of the reflector assembly 20 will be prevented from reaching an element portion 30 due to the presence of the opaque portion 28. As a result, the elemental portion 30 will become transmissive and an opening will be provided between the mirror 16 and the selective reflector 26 so that a laser mode may be struck therebetween.

It is noted that the selective reflective element has a reflection peak 27 about a wavelength of a value $\lambda_3$ as indicated in FIG. 3. In other words, the reflective element 26 will only reflect radiation of wavelengths in a limited band about the value $\lambda_3$, and radiation of a wavelength above or below this band will be substantially transmitted therethrough. Further, as shown in FIG. 3, the value of $\lambda_3$ is of a greater length than either $\lambda_1$ or $\lambda_2$. In addition, the coherent radiation as generated by the laser 12 is of a wavelength approximately equal to $\lambda_3$ so that the beam 62 of the radiation may be transmitted through the elemental portion 30 of the second light absorbing layer 24. The flooding beam 58 of radiation may be directed through the second element 22 and the reflective element 26 without being absorbed or reflected respectively to thereby render the element 24 opaque. Thus, as the beam 60 of light is scanned in a set pattern over the element 22, the corresponding transmissive portion 30 is likewise scanned in response to the beam 60 of light in a similar pattern. As a result, successive portions of the reflective element 26 are seen by the laser 12 to thereby strike the laser mode of operation between the mirror 16 and a portion of the reflective element 26 to thereby provide the beam 62 of coherent radiation.

Although the first absorbing element 24 has been described as being rendered opaque in response to a beam of radiation, element 24 may be made of a material that has the property of being transmissive to radiation of a wavelength above a certain value and absorptive to radiation of a wavelength below this value in response to other beams of radiant energy such as an electron beam. Further, the cathode ray tube 34 could be replaced with an electron gun for scanning a beam of electrons across the element 24 to selectively render portions of the element 24 opaque.

It is known that the reflectivity and the absorption of a semiconductor material for optical radiation in certain frequency ranges depends upon the concentration of free charge carriers in the material. Further, this effect has been proposed as a method of optically controlling radiation by electrically determining the number of charge carriers. As set out in the above-referred to copending application, sufficient free carriers may be generated in a semiconductive member so that the reflectivity at a specific point is sufficient for laser action to begin. However, it is an object of this invention to provied a more efficient means for controlling the reflectivity than that provided by reflectivity modulation which requires intensive beams of radiation or electrons to be directed thereon to provide sufficient free carriers. As described above, this invention utilizes an absorption process which may be carried out in semiconductive members with beams of electrons or radiation that are of many orders of magnitude smaller than that required for reflectivity modulation. Typically, a desired percentage change of absorption can be achieved with $\frac{1}{100}$ or $\frac{1}{1000}$ of the photon or electron current needed to achieve the same percentage change in reflection.

In one particular illustrative embodiment of this invention, the second light absorbing element 22 could be made of a suitable intrinsic semiconductive material such as gallium arsenide having a cutoff at 0.7 micron. The first light absorbing member 24 could be made of a suitable intrinsic semiconductive material such as silicon having a cutoff of approximately 1.3 microns. Illustratively, the radiation source 12 could be a carbon dioxide laser providing a beam of radiation having a wavelength of approximately 10.6 microns. In such a system, the source 52 of uniform radiation could be filtered to provide a flood beam of radiation of a spectral range starting above 0.7 micron but preferably below 1.3 microns (although the upper wavelength of filter 56 is not critical) to be directed through the second light absorbing element 22 to render the entire area of the first light absorbing element 24 opaque. A scanning beam of radiation in the visible region as provided by the flying spot scanners 34 would render a portion of the first light absorbing element 22 opaque, and by absorption of a portion of flooding beam 58, a corresponding portion of the first light absorbing element 24 transparent. Further, a reflector 16 could be made of dielectric sandwich layers having nearly 100% reflectivity at 10.6 microns to thereby enable the radiation source 12 to be triggered instantaneously in a mode defined by the reflecting portion. It is noted that other combinations of elements could be used; for instance, the second light absorbing element 22 could be made of gallium arsenide and the first light absorbing element 24 could be made of indium phosphate for operation with a neodymium laser having a radiation output of approximately 1.06 microns. Different Ga $(As_{1-x}P_x)$ combinations could be suggested for the first and second light absorbing elements to be used with a ruby laser in the system of this invention. Further, the second layer could be made of suitable class III–V compounds and their mixtures, Ge, Si, Sic and InSb.

The radiation control system of this invention is not limited to the application of scanning coherent light as emitted from a laser. As shown in FIG. 4, there is a further embodiment of this invention which has in one specific form a particular application to detecting infrared radiation. There is provided an optical controlling system 70 including a first radiation absorbing member 74 having the property of absorbing radiation of a wavelength below a first value, and a second radiation absorbing member 72 having the property of absorbing radiation of a wavelength below a second value less than the first value. A source 92 emits radiation which is filtered by an element 94 to provide a flood beam 96 of a radiation of a wavelength preferably between the first and second values as defined above. It is noted that the filtered beam 96 can contain radiation of DC wavelength band whose lower limit lies between the first and second values whereas the upper limit may exceed the second value. The flood beam 96 of radiation is focused as by the optical assemblies 98 and 101 over substantially the entire area of the first radiating absorbing member 74. Further, the optical assembly 101 focuses the image as formed on the member 72 on the plane of member 74. It may be understood that the flood beam 96 of radiation is of such a wavelength so that it may be transmitted through the second radiation absorbing member 72 to be absorbed by the first radiation absorbing member 74 to thereby render those portions of the member 74 opaque upon which the beam 96 is directed.

Further, there is provided a suitable means for projecting and scanning a defined beam 85 of radiation such as emitted from a spot on the screen of a cathode ray tube 76. Specifically, the cathode ray tube 76 includes a cathode element 78 for generating electrons, a pair of focusing electrodes 80 for defining a beam of electrons, and two sets of deflection plates 82 and 83 for scanning the beam of electrons over a layer 84 of phosphor. The layer 84 of phosphor emits in response to the incident electron beam the beam 85 of radiation which is directed through a filter element 86 to provide a beam of radiation of a wavelength less than the second value as defined above and is focused by an optical assembly 89. The defined beam 85 of radiation is reflected as by a beam splitter 90 onto the second radiation absorbing member 72 to thereby render an elemental portion 112 upon which the beam is directed opaque. In turn, a portion of the flood beam 98 of radiation is prevented by the opaque portion 112 from falling upon the first light absorbing member 74. As shown in FIG. 4, the opaque portion 112 casts a shadow 114 which is focused as by the optical system 101 onto the first light absorbing member 74 to thereby render an elemental portion 116 transmissive.

A scene 102 from which an image 110 of infrared radiation is directed as by a focusing assembly 104 onto a beam splitter 100. More specifically, the focusing assembly 104 illustratively includes a spherical member 106 which directs the radiation image 110 onto an annular member 108 which in turn reflects the image 110 onto the beam splitter 100. Further, the beam splitter 100 reflects the image 110 of infrared radiation onto the first light absorbing member 74. Thus, an image of the scene 102 is produced on the member 74 by the focusing assembly 104 and the beam splitter 100. It is noted that the beam splitter 100 is transmissive to the flood beam 96 of radiation which is focused therethrough onto the first radiation absorbing member 74. Those portions of the first radiation absorbing member 74 upon which the flood beam 96 of radiation is directed are opaque and therefore will not transmit the image 110 of infrared radiation. However, the defined beam 85 of radiation renders the elemental portion 112 opaque and as a result the elemental portion 116 of the member 74 is shielded from the radiation of the beam 96 and is made transmissive to the image 110 of infrared radiation. Thus, the transmissive elemental portion 116 will allow a discrete portion 122 of the image 110 of infrared radiation to pass through the first radiation absorbing member 74 and to be focused as by an optical assembly 118 onto a suitable detector 120 of infrared radiation. Further, the discrete portion 122 of the image 110 is successively varied as different elemental portions 116 become transmissive in response to the scanning of the beam 85 by the cathode ray tube 76. As a result, discrete portions 122 of the image 110 will be successively scanned and detected in a set pattern by the detector 120. The signal from the detector 120 may now be displayed in any manner known in the art by line read-out. For example, it may be displayed on a television monitor tube which is swept in synchronism with the sweeps on deflection plates 82 and 83. Thus, a visible image is produced on a monitor screen of scene 102. Further, the read-out may be put on a television channel or it may be used on photographic film by modulating the intensity of a suitable spot source as is already known in the art.

In one specific illustrative embodiment of this invention, the second radiation absorbing member 72 may be made of a suitable semiconductive material such as gallium arsenide. Further, the first radiation absorbing member 74 may be made of a suitable semiconductor material such as silicon having a smaller forbidden band gap than that of the material of which the second radiation absorbing member 72 is made. Thus, radiation of a suitable wavelength as provided by the source 92 and the filter 94 will pass through the second light absorbing member 72 but will render the first radiation absorbing member 74 opaque. However, when the beam 85 of a relatively blue or ultraviolet radiation as determined by the filter element 86 is directed onto the second radiation absorbing member 72, a scanning opaque elemental portion 116 results. Further, the detector 120 may be made of a suitable material sensitive to radiation of the infrared frequency such as a copper or mercury doped germanium type semiconductive member. Such infrared radiation detectors have a sensitivity which is limited only by the photon background noise and have response times in the order of $10^{-7}$ seconds or less. With the infrared detecting system as set out herein, information receiving rates of $10^7$ elements per second are possible whereas state of the art mechanical scanners can achieve information acquisition in the order of only $10^4$ to $10^5$ information elements per second.

Referring now to FIG. 5, there is shown an optical system for scanning a target 130 with a beam 62 of coherent radiation. The source of the beam 62 of coherent radiation is the optical modulating system 10 as described in detail with respect to FIG. 1. Suitable means for detecting the reflected radiation from the target 130 is provided by the optical modulating system 70 as described in detail with respect to FIG. 4. In operation, the flying spot scanner 34 provides a defined beam 60 of radiation which is scanned in a pattern 126 across the face of the flying spot scanner 34 and which is reflected by the beam splitter 50 onto the reflector assembly 20 of the optical laser 12. An opaque portion 28 is provided upon the second light absorption layer 22 to provide a reflective portion corresponding therewith as explained above in detail. As shown in FIG. 5, there is provided the source 52 of uniform radiation which is filtered by element 56 and focused by the optical assembly 54 onto the reflector assembly 20. A laser mode is struck between the reflector assembly 20 and the reflector 16 to provide the defined beam 62 of coherent radiation. As the beam 60 is scanned across the assembly 20 in a pattern denoted by a numeral 128, a resultant beam 62 of coherent radiation is likewise scanned across the target 130 in a corresponding raster or pattern 134. That particular area of the target 130 onto which the beam 62 is directed is denoted by the numeral 136 and may be thought of as a scanning element in accordance with the pattern 134.

The optical modulating system 70 is disposed so as to receive at a selected angle a reflected beam 124 of radiation and to provide an output signal corresponding to the intensity of this radiation. More particularly, the reflected beam 124 of radiation is reflected by the beam splitter 100 through the transparent portion 116 of the first radiation absorption member 74 to be focused by the optical assembly 118 onto the radiation detector 120. As described above in detail with regard to FIG. 4, a suitable flying spot scanner such as a cathode ray tube 76 projects the defined beam 85 of radiation to be reflected by the beam splitter 90 onto the second radiation absorption member 72 to provide the opaque elemental portion 112. A source 92 of uniform radiation is filtered by the element 94 and is directed by a suitable lens assembly not shown through the second absorptive member 72 onto the first absorptive member 74 to render the incident portions of this member opaque. In operation, the opaque elemental portion 112 established by the flying spot scanner 76 upon the second absorptive member 72 creates the transparent portion 116. The transparent portion 116 is scanned across the member 74 in a pattern 138 in accordance with the scanning beam 85 of radiation provided by the cathode ray tube 76. As the transparent spot 116 is scanned across the radiation absorptive member 74, an elemental portion of the entire radiation reflected from the target 130 is directed onto the detector 120.

It is an object of this embodiment that the beam 62 of coherent radiation be directed onto the target 130 and be reflected from the elemental portion 136 to be sensed by the detector 120. The detector 120 may be thought of sensing an elemental portion of the target 130 which is determined by the placement of the transparent portion 116. As the transparent portion 116 is scanned in the pattern 138, the detector 120 will in a sense "see" the entire area of the target 130. In accordance with the teachings of the embodiment, that portion of the target 130 which the detector 120 "sees" is made to correspond with the elemental portion 136 onto which the beam 62 of coherent radiation is directed by the system 10. To accomplish this, a scanning circuit 140 is connected to the flying spot scanner 34 and to the flying spot scanner 76. It may be understood that a discrete length of time is needed for the radiation to travel from the source 12 to the detector 120 and that in order to provide an exact synchronization between the system 10 and 70, a phase or time delay must be introduced as by the delay circuit 142 into the scanning operation of the cathode ray tube 76. In one illustrative embodiment of this invention, the cathode ray tubes 34 and 76 may be of the electrostatic variety having suitable voltages applied to the deflection electrodes of these devices to achieve the desired scanning. By introducing an appropriate delay in the scanning of the radiation system 70, the detector 120 may sense the light reflected from the elemental portion 136 of the target 130. A selective system such as described above has the particular advantages of high sensitivity due to the fact that the detector is sensing only discrete portions of the target. Further, the system as described with regard to FIG. 5 is able to discriminate against other objects that are not within the target area 130 and additionally may be used to determine the distance the target 130 is from the system by measuring the delay introduced by the circuit 142. The operation of the system described in FIG. 5 is similar to that described in a copending application, Ser. No. 424,577 to Harniston and Marshall, entitled "Optical Imaging and Ranging System," and assigned to the assignee of this invention.

Since numerous changes may be made in the above described apparatus and different embodiments of the invention may be made without departing from the spirit thereof, it is intended that all matter contained in the foregoing description and as shown in the accompanying drawings, shall be interpreted as illustrative and not in a limiting sense.

I claim as my invention:

1. A radiation control system comprising first and second filter means, first means for directing a first beam of radiant energy onto said first filter means, said first filter means being converted from a state of being transmissive to being opaque to substantially all radiation by a process of free carrier induced absorption in response to said first beam of radiant energy, said second filter means having the property of transmitting said first beam of radiant energy, and second means for directing a second beam of radiant energy onto a portion of said second filter means, said second filter means having the property of being rendered non-transmissive to said first beam of radiation by a process of free carrier induced absorption in response to said second beam of radiation, said second filter means being disposed with respect to said first filter means and first means so that said non-transmissive portion intercepts a part of said first beam of radiant energy to thereby render a corresponding portion of said first filter means transmissive.

2. A radiation control system as claimed in claim 1 wherein said first and second filter means are made of semiconductive materials.

3. A radiation control system comprising first means having the property of being transmissive to radiation of a wavelength above a first value and absorptive of radiation below said first value thereby becoming opaque to substantially all wavelengths of radiation by a process of free carrier induced absorption, second means having the property of being transmissive to radiation of a wavelength above a second value and absorptive of radiation below said second value thereby becoming opaque to radiation of substantially all wavelengths by a process of free carrier induced absorption, said second value being less than said first value, third means for directing a first beam of radiation onto said first means, the lower wavelength of said first beam being greater than said second value and below said first value, and fourth means for directing a second beam of radiation of a wavelength less than said second value onto a selected portion of said second means to thereby render said selected portion of said second means opaque, said second means disposed with respect to said first means and said third means so that said opaque portion of said second means intercepts a part of said first beam of radiation to thereby render a corresponding portion of said first means transmissive to radiation of a wavelength above said first value.

4. A radiation control system as claimed in claim 3, wherein there is included a fifth means for providing a third beam of radiation, and sixth means for reflecting said third beam of radiation disposed between said first and second means, said sixth means having the property of being substantially transmissive to said first beam of radiation.

5. A radiation control system as claimed in claim 4, wherein said sixth means is selectively reflective of radiation in a range about a wavelength of a third value greater than said first value.

6. A radiation control system as claimed in claim 4, wherein said fifth means has the property of generating a coherent beam of radiation, said fifth means including means for reflecting said beam of coherent radiation disposed at one end of said fifth means; said first means, said sixth means, and said second means disposed at the other end of said fifth means, said first means having the property of being transmissive to said third beam of coherent radiation to thereby allow said third beam of coherent radiation to be transmitted through said transmissive portion of said first means to be reflected by said sixth means.

7. A radiation control system as claimed in claim 6, wherein said fifth means for providing a third beam of coherent radiation is of such a configuration that one of the ends of said fifth means has a larger area than the other end.

8. A radiation control system as claimed in claim 7, wherein the ends of said fifth means for providing a third beam of coherent radiation are of a spherical configuration concentric with each other.

9. A radiation control system as claimed in claim 3, wherein there is included fifth means for directing a radiation image onto said first means, and sixth means disposed to receive a part of said radiation image which is directed through said transmissive portion of said first means to provide a signal in response to said part of said radiation image.

10. A radiation control system as claimed in claim 9, wherein said fifth means includes seventh means disposed between said first and second means for reflecting said radiation image onto said first means, said seventh means having the property of being transmissive to said first beam of radiation, and eighth means for focusing said radiation image onto said seventh means.

11. A radiation control system as claimed in claim 3, wherein said first and second means are made of intrinsic semiconductive materials.

12. A radiation scanning system including the system as claimed in claim 9, wherein there is included seventh means for directing a third beam of radiation onto a portion of a target, said fifth means being so disposed to receive the reflected radiation from said target, and eighth means for synchronizing said seventh means and said fourth means so that said sixth means senses the reflected radiation from said portion of said target.

13. The radiation scanning system as claimed in claim 2, wherein said seventh means includes a source of radiation, ninth means having the property of transmitting radiation of a wavelength above a third value and being opaque to radiation of a wavelength below said third value thereby becoming opaque to radiation of substantially all wavelengths by a process of free carrier induced absorption, tenth means having the property of transmitting radiation above a fourth value and being opaque to radiation below said fourth value thereby becoming opaque to radiation of substantially all wavelengths by a process of free carrier induced absorption, said third value being less than said fourth value, eleventh means for directing a fourth beam of radiation onto said tenth means, the lower wavelength of said fourth beam being greater than said third value and below said fourth value, and twelfth means for directing a fifth beam of radiation of a wavelength less than said third value onto a portion of said ninth means to thereby render a portion of said ninth means opaque, said ninth means disposed so that said opaque portion intercepts a portion of said fourth beam of radiation to thereby render a portion of said tenth means transmissive, said source of radiation being disposed to be directed through said transmissive portion of said tenth means to form said third beam of radiation.

14. A radiation scanning system as claimed in claim 13, wherein said source of radiation is a laser device.

References Cited
UNITED STATES PATENTS

| | | | |
|---|---|---|---|
| 2,315,113 | 3/1943 | Farnsworth | 178—7.5 |
| 3,085,469 | 4/1963 | Carlson | 88—24 |
| 3,225,138 | 12/1965 | Montani | 178—7.2 |
| 3,395,368 | 7/1968 | Koester | 331—94.5 |

RONALD L. WIBERT, Primary Examiner

P. K. GODWIN, Assistant Examiner

U.S. Cl. X.R.

350—290, 293; 331—94.5